United States Patent [19]

Leaver

[11] 4,218,094
[45] Aug. 19, 1980

[54] SAFETY BRACE

[75] Inventor: John Y. Leaver, Quincy, Ill.

[73] Assignee: The Knapheide Mfg. Co., Quincy, Ill.

[21] Appl. No.: 875,470

[22] Filed: Feb. 6, 1978

[51] Int. Cl.$^2$ ............................................... B60P 1/04
[52] U.S. Cl. .................................. 298/17 B; 248/351;
280/763
[58] Field of Search .................... 298/17 B, 10, 17 R,
298/17 S, 17.5, 17.8, 18, 19 R, 22 R, 22 P;
280/763, 764, 765, 766; 248/351, 357, 354 R

[56] References Cited
U.S. PATENT DOCUMENTS

| | | | |
|---|---|---|---|
| 2,634,941 | 4/1953 | Eckert | 280/763 |
| 2,780,067 | 2/1957 | Jacobi et al. | 248/351 X |
| 3,643,907 | 2/1972 | Ham | 280/763 X |
| 3,813,124 | 5/1974 | Roland . | |
| 3,879,055 | 4/1975 | Sill | 280/763 |

Primary Examiner—Frank E. Werner
Attorney, Agent, or Firm—Geoffrey R. Myers

[57] ABSTRACT

Provided is a brace for preventing a truck body from falling when raised above its chassis for maintenance, inspection or servicing. The brace includes a support column, one end of which is pivotally connected to a body longsill and the other end is retained by a release mechanism located on the body for holding the column in riding position. Provided on the chassis is a retainer for securely retaining the column when it extends between the body (when raised) and chassis as a brace to prevent the body from falling. A stop is provided for limiting the pivot angle of the column. The brace is installed in supporting position without an operator having to locate any portion of his body under the truck body while raised. This is accomplished by actuating the release mechanism to release the column. The body is then raised from remote control location and the column pivots until it abuts its stop mechanism which locates the lower end of the column above the retainer on the chassis. Lowering of the body then joins the column and retainer to form a brace structure which prevents the body from being further lowered.

13 Claims, 7 Drawing Figures

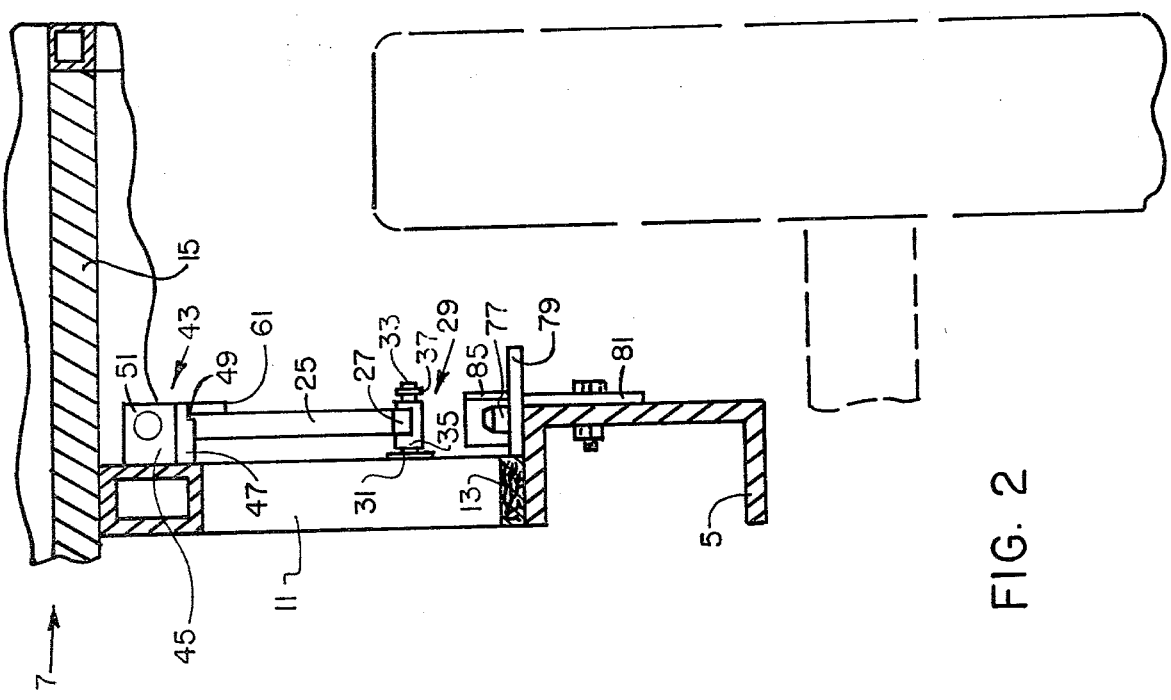
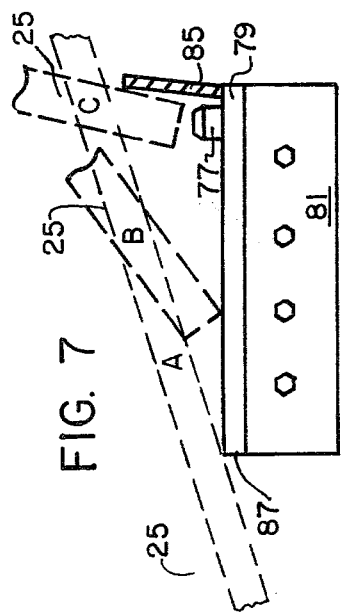
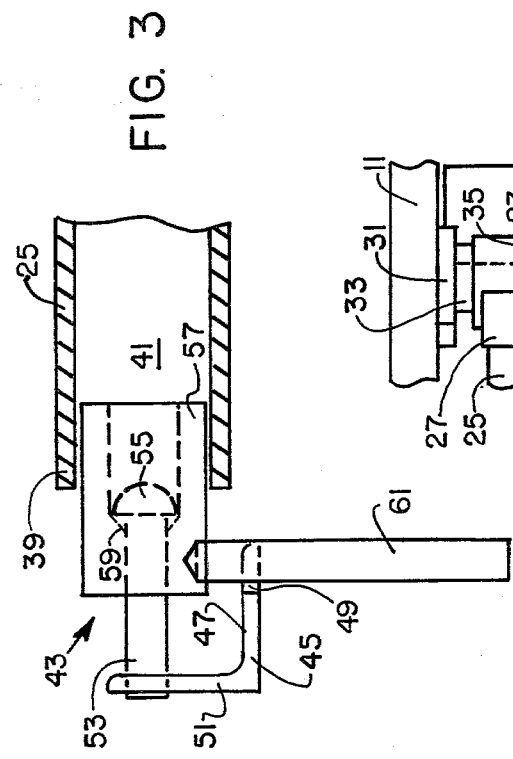
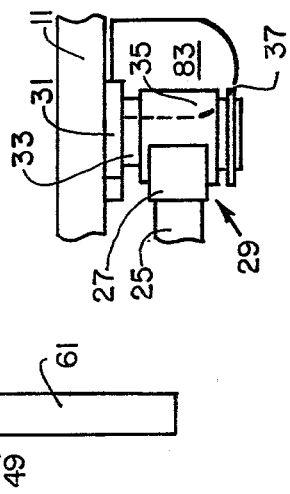

SAFETY BRACE

This invention relates to safety braces. More particularly, this invention relates to safety braces useful for retaining truck bodies in their raised position and to methods for using same.

Vehicles, primarily trucks, which employ cargo bodies that are raisable and lowerable about a pivot point, usually by a hydraulic hoist, are well known. Generically, such bodies are called "dump" bodies and include a wide variety of types and styles. Examples of a few are: construction type dump bodies, grain bodies, stake bodies, livestock bodies, and the like.

Such vehicles usually include a chassis-cab having a rearwardly extending chassis frame and a body pivotally connected to the chassis frame at their rearward portions. The body normally rests for riding on the chassis frame, but is raised for dumping from its rear gate by a hoist mechanism located between and having respective end connected to the body and chassis.

During normal operations, the hoist and body must be free of restraints other than those provided by the hoist in order to be raisable and lowerable. For maintenance, installation, servicing or inspection of the vehicle, however, it is often necessary to raise the body and work under it by leaning over the chassis frame. The area created between the chassis and raised body, unsupported, presents a well-known pinch point. Even the area outboard of this is highly dangerous since the descending outboard body portion, even without the chassis under it, can do serious damage. In order to protect against this danger, the art has long insisted upon the use of a permanent support attached to the vehicle which may be used to brace the body when raised and left unattended or when maintenance, installation, inspection or service work are required to be performed in the area.

While these prior devices have been reasonably operable, they have not been readily accepted by the consumer because they are too costly to build or install, they are inconvenient to use, they present dangers in use, or a combination of these difficulties exists with the device. For this reason, there exists a definite need in the art for an effective, inexpensive, and strong safety brace which is convenient and safe to use and which is easily installed. It is a purpose of this invention to fulfill this and other needs which will become more apparent to the skilled artisan once given the following disclosure:

Generally speaking, this invention fulfills these needs by providing an apparatus and method for suing it. The apparatus generally comprises a support column having a first and second end, means pivotally connecting said first end of the support column to the vehicle body, means attached to said body for detachably locking said column in a riding, nonsupporting position, means located proximate to said vehicle chassis for securely retaining said second end of said column in a position which supports the weight of the body on said chassis when the body is in a raised position, and means for limiting the normal rotation of said column about said pivot connection as is caused by gravity so as to locate the said second end of the column when said column is in its downmost condition at a position with respect to the means located proximate to the vehicle chassis for securely retaining said second end, such that lowering of the body brings the said second end of the column into securing engagement with said proximately located retaining means.

The method for using the apparatus, or stated another way, for securely bracing a vehicle body from falling from a raised position above a vehicle chassis to which the body is pivotally connected, generally comprises providing a support column having a first end and a second end; providing a retaining means associated with said chassis for retaining said column at its second end; pivotally connecting the first end of said column to said body; detachably retaining the column in proximal relationship to said body and thereafter detaching the column from its retained position proximal to said body while said body is in its unraised position; raising said body to allow said column to pivot by gravity about its first end until said second end of said column is aligned above said retaining means associated with said chassis; preventing said column from pivoting beyond its aligned position above said retaining means; and lowering said body until the column is securely retained by said retaining means and the column braces the body against further lowering or falling.

This invention will now be described with respect to certain embodiments thereof, wherein:

IN THE DRAWINGS

FIG. 2 is an end, partially sectionalized, view of the embodiment of FIG. 1;

FIG. 3 is a side, partially sectionalized, view of a locking mechanism used in the practice of this invention;

FIG. 4 is a plan view of a pivot and limit mechanism used in the practice of this invention;

FIG. 7 is a side schematic of the brace installation.

Figure 1:
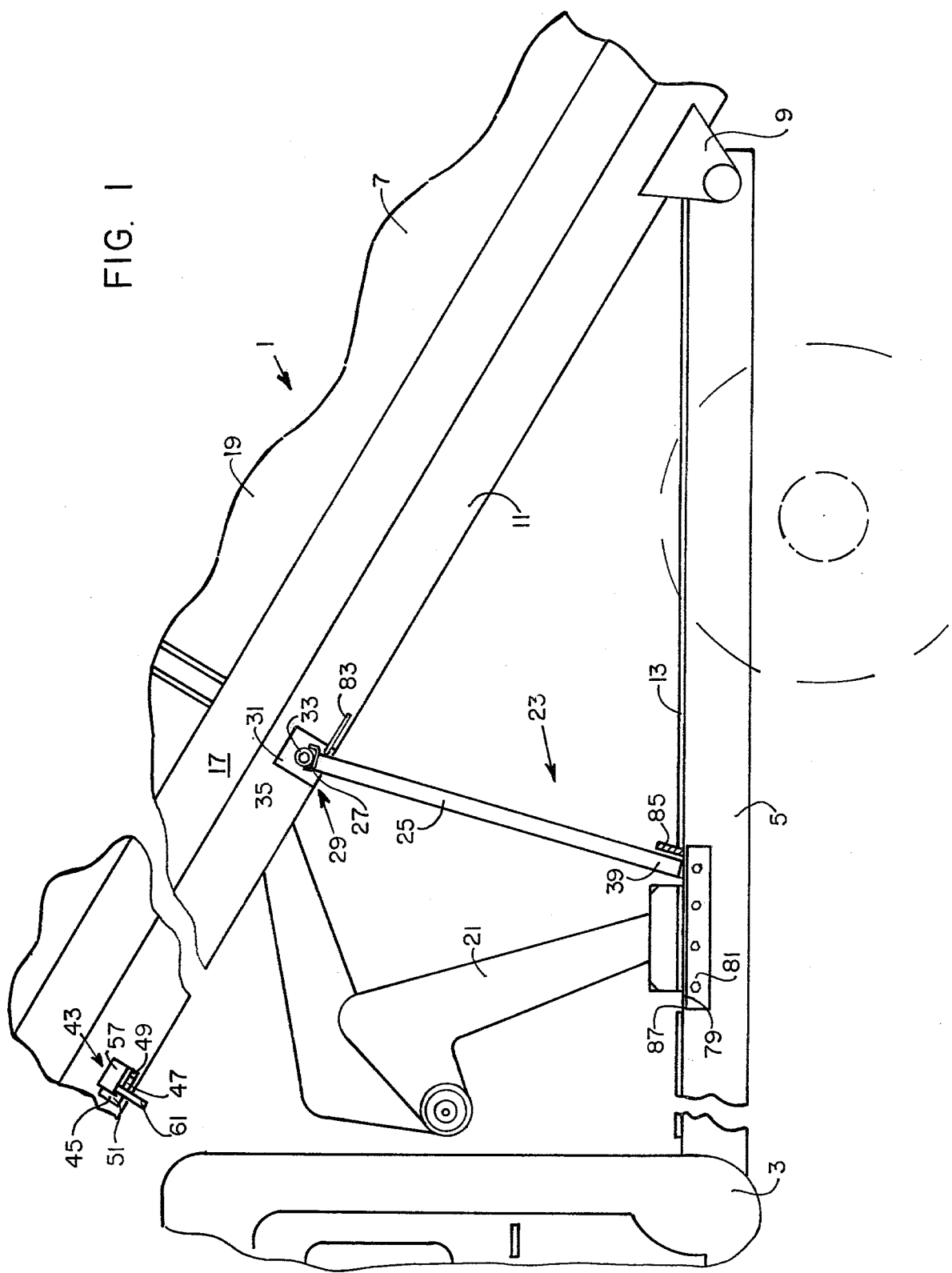
FIG. 1 is a side, partially sectionalized, view of an embodiment of this invention.

With reference initially to FIGS. 1-2, there is illustrated a typical "dump" truck 1 comprised of a cab 3, a chassis 5 and a body 7. Body 7 may be of a wide variety of types (e.g. farm, construction, platform, etc.) and is pivotally connected to chassis 5 by conventional pivot hinge means 9.

Body 7 includes a longsill 11 for each chassis member 5 on either side of truck 1. Thus, in the usual truck 1, there exists two parallel longsills 11 and two chassis frame members 5, one on either side of the truck. Longsill 11 is aligned by pivot 9 so that in its normal or riding position, longsill 11 rests upon chassis member 5. A cushion 13 of wood or rubber is often provided on chassis 5 on which longsill 11 will rest. Body 7 further includes cross-members 15, a side rail 17, and a cargo body portion 19.

In order to pivot body 7 from its resting or riding position on chassis cushion 13 to its dumping or raised position, a hoist means 21 is provided. Hoist 21 may be of any conventional type whose size is chosen for the body and load requirements according to well-known guidelines in the industry. If, for example, a farm body (e.g. grain body) of 18 ft. with a cab-to-axle dimension of 168 inches and a C.T. dimension of 156 inches is employed wherein the body overhang is 18 inches, a model KH-2527L KNAPHOIST hydraulic twin cylinder hoist of the general configuration illustrated in FIG.

1 may be used. The KNAPHOIST hoist is manufactured by The Knapheide Manufacturing Company of Quincy, Illinois. When employed, the dimension from rear pivot hinge 9 to hoist attachment on body should be about 145 inches at 40 degrees. The rated capacity (in tons) at dump angle 40 degrees=25.5; at 45 degrees=22.5; and at 50 degrees=20.5.

The hoist, if hydraulic, is conventionally powered by a hydraulic pump whose power is obtained from a conventional power take-off device located at the transmission of truck 1. The directional control valve on the pump which operates the hoist is manipulated by remote control levers or pull cables located, usually, in the cab of the vehicle. Since all of the power train devices are conventional, they are not specifically illustrated.

For inspection, maintenance or other purposes, it is often necessary to raise body 7 from its riding position and to have workmen perform tasks under and around the raised body. Unless braced, this raised body presents a significant potential hazard by way of inadvertent or unexpected falling as hereinabove described. Indeed, the area between the bottom surface of longsill 11 and the top surface of cushion 13 forms a well-known pinch point of significant danger. Even the outboard portion can do considerable damage.

In order to safely guard against the aforesaid danger, there is provided, according to this invention and as an embodiment thereof, safety brace 23 shown in FIG. 1 in its supporting position and in FIG. 2 in its locked or riding position. Brace 23 includes a hollow tubular column member 25 having a first end 27 which is connected to a pivot mechanism 29. Pivot mechanism 29 includes a plate 31 connected to the outboard side of longsill 11, a stationary shaft 33 connected to plate 31, a hollow pivot tube 35 of larger diameter than shaft 33 for rotation about shaft 33 which extends therethrough, and retaining ring 37 for retaining tube 35 on shaft 33. First end 27 is connected to tube 35 and thus column 25 is free to rotate about shaft 33.

The other or second end 39 of column 25 is hollow, thus defining an open cavity 41 therein. While various techniques may be used to hold or retain column 25 in its riding position, (position shown in FIG. 2) along longsill 11, hollow cavity 41 provides a convenient means for securing this position. In FIGS. 1–3 and 5–6, two different mechanisms for detachably locking second end 39 and thus retaining column 25 in its riding position are shown.

With reference first to the mechanism of FIGS. 1–3, locking mechanism 43 generally includes an L-shaped bracket or flange 45 connected to and extending outboard of longsill 11. Lower horizontal (e.g. longitudinal) leg 47 contains a detent notch 49. Upper vertical (e.g. upwardly extending) leg 51 retains shaft 53 whose extreme end 55 is enlarged.

Slidably located on shaft 53 is locking stud 57 of compatible shape but smaller dimension than cavity 41. As illustrated, both stud 57 and cavity 41 are round. Stud 57 is hollow and shaft 53 extends therein. The hollow cavity is of two different dimensions so as to form a stop surface 59 against which enlarged end 55 will abut and prevent stud 57 from being removed from shaft 53. Handle 61 extends radially from stud 57 and is of a size sufficient so as to be retainable in the riding position in detent 49.

Figure 5:
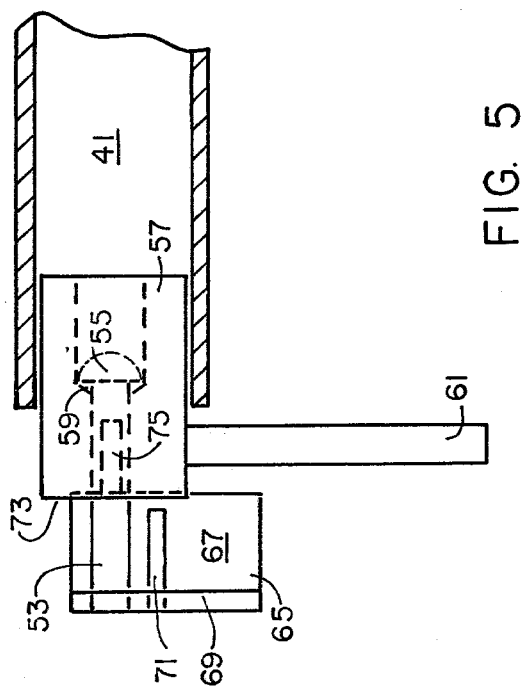
FIG. 5 is a side, partially sectionalized, view of another locking mechanism used in the practice of this invention.
Figure 6:
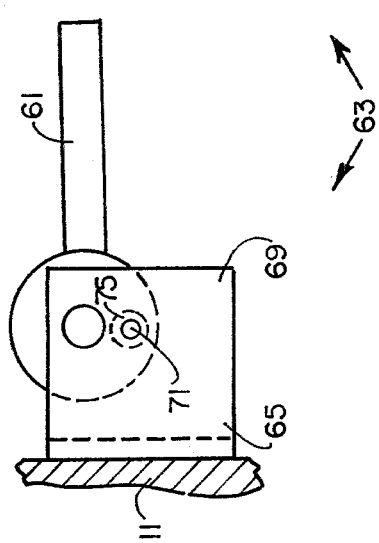
FIG. 6 is an end view of FIG. 5 with the mechanism shown in its unlocked or withdrawn posture.

FIGS. 5–6 illustrate another locking mechanism 63 useful in place of mechanism 43. Locking mechanism 63 includes the same shaft, stud and handle arrangement as illustrated in FIG. 3. However, in this embodiment, there is provided angle 65 having one plate 67 connected to longsill 11 and another plate 69 extending therefrom. In addition to retaining one end of shaft 53, plate 69 has extending therefrom a retaining shaft 71. There is provided in the rear surface 73 of stud 57 a hole or cavity 75 so positioned that when mechanism 63 is in its withdrawn or locked position (FIG. 6) shaft 71 extends into hole 75.

In order to secure column 25 in its supporting position when body 7 is raised (as illustrated in FIG. 1) there is provided on chassis 5 a nipple stud 77 which extends upwardly from runway plate 79. Runway plate 79 extends across the top of chassis 5 so as to locate nipple stud 77 in proper position for alignment with cavity 41 in the second end 39 of column 25. Plate 81 bottled to chassis 5 is connected to runway 79 thereby securing runway 79 in place.

Two alternative means are illustrated for limiting the rotation of column 25 and thus bringing cavity 41 automatically into alignment with nipple 77. Either or both of these means may be used. The first is gusset plate 83 located proximate pivot mechanism 29. The second is backboard 85 located proximate nipple 77. Either or both of these means enables the brace to be placed in supporting position by manipulation of the hoist via its cab controls and without anyone being located under body 7 when raised.

OPERATION

FIG. 7 illustrates the employment of brace 23. Longsill 11 initially resides on cushion 13 and thus body 7 is in its riding position. In this position, column 23 is secured in its riding position by locking mechanism 43 or 63. Before body 7 is raised, handle 61 is grasped and stud 57 is slidably retracted along shaft 53 until stud 57 clears end 37 of column 39. If mechanism 63 is employed, the handle is rotated so as to align shaft 71 in hole 75 thereby to store the locking mechanism securely. If mechanism 43 is used, handle 61 assumes the posture as shown in FIG. 1 or it may be returned to its detent retaining posture within detent 49 once column 25 is swung clear.

After stud 57 clears cavity 41, column 25 rotates about pivot 29 by gravity until it rests on the forward end 87 of runway plate 79. In FIG. 7 this is illustrated as position "A". The operator then returns to the cab. Until this time body 7 is still in its riding position and has not been raised.

Hoist 21 is now operated safely from the cab to raise body 7 by pivoting it about pivot 9. As this occurs, column 25 slides along runway plate 79 toward nipple 77. This is shown in FIG. 7 as position "B".

Further operation of the hoist causes column 25 to rotate by gravity until column 25 abuts either gusset 83 or backboard 85 or both (if both are used) thereby aligning column 25 with nipple 77. This is illustrated in FIG. 7 as position "C". Reverse operation of hoist 21 will lower second end 39 of column 25 onto nipple 77 causing nipple 77 to reside in cavity 41. When second end 39 abuts plate 79 or (because of the angle) a portion of nipple 77, body 7 is safely braced against further falling and column 25 is securely retained in its bracing position. At no time was an operator required to be under body 7 when in a raised position. In this respect, it is noted that pivot means 29 are located rearward of nipple 77 such that column 25 forms an obtuse angle with the forward portion of chassis 5. This adds strength and security. One brace may be used or for larger bodies a brace on each side of truck 1 may be employed.

To lower body 7, the body is raised slightly via hoist operation until column 25 assumes position "C". In this position, while the body is raised, it is relatively safe for the operator to momentarily enter the area under the body cross sills 15 since maintenance work etc. has now been completed and since, if the body were to fall, it would merely fall back into its safety brace supporting position.

The operator, seeing that the body is not falling from position "C", momentarily steps under the body, but not within the aforesaid pinch point area to raise column 25 and lock it into its riding position by operating mechanism 43 or 63. This is accomplished by sliding stud 57 on shaft 53 via handle 61 until stud 57 is located in cavity 41 and end 55 abuts surface 59. If mechanism 43 is employed, handle 61 is then rotated into detent 49. If mechanism 63 is employed, handle 61 is usually rotated to its downward most position as shown in FIG. 5. The operator then returns to the cab, and by further operation of hoist 21 lowers body 7 until longsills 11 rest on cushions 13.

Once given this disclosure, many other features, modifications, and improvements will become apparent to the skilled artisan. Such features, modifications and improvements are therefore considered a part of this invention, the scope of which is to be determined by the following claims:

I claim:

1. An apparatus for supporting a vehicle body pivotally connected to a vehicle chassis when said body is in a raised position, said apparatus being operable from its riding to its body supporting position without the operator being located under the body at any time the body is in any raised position above the vehicle chassis frame on which the body normally resides, the apparatus comprising a support column having a first and second end, means pivotally connecting said first end of the support column to the vehicle body, means attached to said body for detachably locking said column in a riding, nonsupporting position, means located proximate to said vehicle chassis for securely retaining said second end of said column in a position which supports the weight of the body on said chassis when the body is in a raised position, a runway plate means connected to said chassis for assisting the support column into its body supporting position, said plate means extending longitudinally of the vehicle and including a substantially horizontal platform having a forwardmost end and a rearwardmost end, said proximately located means for securely retaining the second end of the column being positioned on and adjacent the rearwardmost end of the platform, the second end of the column when in riding position extending longitudinally of the forwardmost end of the platform, and means for limiting the normal rotation of said column about said pivot connection as is caused by gravity so as to locate the said second end of the column when said column is in its downmost condition at a position with respect to the means located proximate to the vehicle chassis for securely retaining said second end, such that lowering of the body brings the said second end of the column into securing engagement with said proximately located retaining means.

2. The apparatus according to claim 1 wherein the second end of said column includes a hollow cavity and said retaining means comprises an upwardly extending male member of a size less than that of said cavity, said supporting position being defined by the male member residing in said cavity and the second end of said column residing on said platform.

3. The apparatus according to claim 2 wherein the male member is located with respect to the longitudinal direction of the chassis forward of the first end of said column such that said column in supporting-position defines a forwardly extending obtuse angle with said platform.

4. In the combination of a truck chassis, a load carrying body, means located at the rearward portion of the body and chassis for pivotally connecting the body to said chassis, a hoist means for raising the body from the chassis about the pivot means and for lowering the body onto the chassis about the pivot means thereby to define a raised position and a riding position respectively, and apparatus capable of extending between said body and said chassis for bracing said body against falling when the body is in its raised position, the improvement comprising as said apparatus, the apparatus of claim 3.

5. An apparatus for supporting a vehicle body pivotally connected to a vehicle chassis when said body is in a raised position, the apparatus comprising:

a support column having a first and second end, means pivotally connecting said first end of the support column to the vehicle body, means attached to said body for detachably locking said column in a riding, nonsupporting position and comprising means for engaging the second end of said column, means for moving said engaging means into and out of engagement with said second end of said column and means for retaining said moving means against movement of the engaging means out of disengagement with said second end of said column and wherein said second end of the column is hollow thereby defining an open-ended cavity, wherein said engaging means includes a stationary shaft having rotatably and slidably located therein a stud means of compatible shape but lesser cross-sectional dimension than said open-ended column cavity, wherein said moving means includes a handle extending radially from said stud means, and wherein said means for retaining said moving means includes a flange member connected to the vehicle body and provided with a structure so located that when said stud means is in its engaging position within said open-ended column cavity, said handle means may be rotatably located with respect to said structure so as to prevent disengaging movement of said stud means out of said open-ended column cavity, means located proximate to said vehicle chassis for securely retaining said second end of said column in a position which supports the weight of the body on said chassis when the body is in a raised position, and means for limiting the normal rotation of said column about said pivot connection as is caused by gravity so as to locate the said second end of the column when said column is in its downmost condition at a position with respect to the means located proximate to the vehicle chassis for securely retaining said second end, such that lowering of the body brings the said second end of the column into securing engagement with said proximately located retaining means.

6. An apparatus according to claim 5 wherein said flange member is substantially L-shaped, the vertical leg of said "L" extending in the vertical direction of said body and the lower leg of said "L" extending in the longitudinal direction of said body, said structure being a detent located in said lower leg and one end of said shaft being connected to the vertical leg such that said handle may be rotatably located within said detent thereby to prevent said disengaging movement of said stud means out of said openended column cavity.

7. An apparatus according to claim 6 wherein the shaft end opposite that connected to the flange is of an enlarged cross-sectional dimension, and wherein said stud comprises a chamber in which said shaft resides, said chamber including two different cross-sectional dimensions one larger than said enlarged shaft end and one smaller than said enlarged shaft end, the enlarged shaft end residing in said larger chamber portion, the smaller chamber portion being of sufficient length to allow said stud to be slid along said shaft into and out of engagement with the column, the enlarged end of said shaft thereby comprising a stop means for preventing the stud from being removed from said shaft.

8. In the combination of a truck chassis, a load carrying body, means located at the rearward portion of the body and chassis for pivotally connecting the body to said chassis, a hoist means for raising the body from the chassis about the pivot means and for lowering the body onto the chassis about the pivot means thereby to define a raised position and a riding position respectively, and apparatus capable of extending between said body and said chassis for bracing said body against falling when the body is in its raised position, the improvement comprising as said apparatus, the apparatus of claim 5.

9. An apparatus according to claim 5 wherein said structure comprises a pin extending from said flange in the direction of said stud means, said stud means being provided with a pin engaging orifice in one surface thereof, said pin being so located and of a sufficient size such that when said handle is in its most downwardly rotatable position said orifice is out of alignment with said pin and said pin prevents disengaging movement of said stud means out of said open-ended column cavity and when said handle is rotated so as to align said orifice with said pin said stud may be slidably moved along said shaft thereby to disengage said stud from said open-ended column cavity.

10. A safety brace mechanism for supporting a vehicle body when in a raised position above a vehicle chassis to which said body is pivotally connected and on which said body normally resides, and wherein said safety brace mechanism is capable of being retained in a riding, non-supporting position and a raised body supporting position, said mechanism being so constructed and arranged as to be capable of being moved from its riding, non-supporting position to its raised body supporting position without an operator being located under the body when the body is in any raised position above the vehicle chassis even if the chassis is tilted at a substantial degree from the horizontal, the mechanism comprising:

an elongated post-like support column having a first and a second end, means pivotally connecting the first end to the vehicle body in such a way that if said support column were free to rotate about said pivot means, said column would assume a vertical posture as governed by gravity, and runway means connected to and extending from said chassis, said runway means having an upstanding projection means located at a point displaced from that of the vertical posture of said column as governed by gravity for engaging and securely retaining the second end against movement when said column is in its raised body supporting position, an obstruction means connected to said body proximal the first end of the column and located in the path of rotation of the column as governed by gravity capable of preventing said column from reaching a location at or substantially close to its vertical posture when said chassis is horizontal and said body is raised thereabove a sufficient distance such that, without said obstruction, said column would normally assume a vertical posture as governed by gravity, the obstruction forming a point of engagement with said column within the path of rotation of the column as governed by gravity which is in alignment with the upstanding projection means for securely retaining the second end of said column against movement such that at said point of engagement said second end of the column can be automatically brought into securing retention with said upstanding projection means from a position adjacent said upstanding projection means by pivoting said body toward said chassis even if the chassis is tilted at a substantial degree from the horizontal, and means attached to said body for detachably retaining said column in said riding, non-supporting position.

11. In the combination of a truck chassis, a body pivotally connected thereto, means for pivoting said body on said chassis and apparatus capable of extending between said body and said chassis for bracing said body against falling when the body is in its raised position with respect to said chassis, the improvement comprising as said apparatus, the apparatus of claim 10.

12. The method of securely bracing a vehicle body from falling from a raised position above a vehicle chassis to which said body is pivotally connected and on which said body normally resides, even if the chassis is tilted at a substantial degree from the horizontal and without an operator being located under the body when the body is in any raised position above the vehicle chassis, the vehicle employing for this purpose a safety brace mechanism which includes:

an elongated post-like support column having a first and a second end, the first end being pivotally connected to the vehicle body in such a way that if said support column were free to rotate about its pivot connection the column would assume a vertical posture as governed by gravity, means attached to said body for detachably retaining the second end of said column, such that when said second end is retained thereby, said column is in a riding, non-supporting position, and runway means connected to and extending from the chassis for guiding the column to a position adjacent its raised-body bracing position, said runway means having an upstanding projection means located at a point displaced from that of the vertical posture of said column as governed by gravity for engaging and securely retaining the second end against movement when said column is in its raised body supporting position, an obstruction means connected to said body proximal the first end of the column and located in the path of rotation of the column as governed by gravity capable of preventing said column from reaching a location at or substantially close to its vertical posture when said chassis is horizontal and said body is raised thereabove a sufficient distance such that, without said obstruction, said column would normally assume a vertical posture as governed by gravity, the obstruction forming a point of engagement with said column within the path of rotation of the column as governed by gravity which is in alignment with the upstanding projection means for securely retaining the second end of said column against movement such that at said point of engagement said second end can be automatically brought into securing retention with said upstanding projection means from a position adjacent said upstanding projection means by pivoting said body toward said chassis even if the chassis is tilted at a substantial degree from the horizontal, the steps of said method comprising:

detaching the second end of said column from the detachable retaining means attached to said body while said body resides on said chassis, pivoting said column about its first end in a direction toward the vertical until said column rests on said runway means, and thereafter without any portion of an operator being located under the body, pivotally raising said body with respect to said chassis thereby to cause further pivoting of said column about its first end in a direction toward the vertical, until said column contacts said obstruction means thereby forming said point of engagement and said alignment of the second end of said column with the upstanding projection means for securely retaining the second end, and pivotally lowering said body with respect to said chassis until said second end of said column securely engages said upstanding projection means thereby to brace said body from falling from its raised position above said chassis.

13. The method according to claim 12 wherein the body is pivotally raised and lowered by manipulating a hoist means located between the body and chassis from controls located at a position other than one under the body.

* * * * *